METHOD OF TREATING A RECORDING MEDIUM

Original Filed Oct. 5, 1959

2 Sheets-Sheet 1

Inventor
Donald E. Richardson
By Anderson, Luedeka, Fitch, Even & Tabin
Atty's

April 18, 1967 D. E. RICHARDSON 3,315,137

METHOD OF TREATING A RECORDING MEDIUM

Original Filed Oct. 5, 1959 2 Sheets-Sheet 2

Inventor
Donald E. Richardson

By Anderson, Luedeka, Fitch, Even & Tabin
Atty's 3,315,137
METHOD OF TREATING A RECORDING MEDIUM

Donald E. Richardson, Chicago, Ill., assignor to IIT Research Institute, Chicago, Ill., a non-profit corporation of Illinois Original application Oct. 5, 1959, Ser. No. 844,472, now Patent No. 3,159,718. Divided and this application Jan. 22, 1964, Ser. No. 339,552
5 Claims. (Cl. 317—262)

This invention relates to electrostatic recording and particularly to a method of treating a recording medium employed in an electrostatic recording system.

In an electrostatic recording system described in my copending application, Ser. No. 844,472, filed October 5, 1959, now U.S. Patent No. 3,159,718 of which application this application is a division, a dielectric tape is drawn between two tandem, close-spaced knife-edged electrodes having a common flexible backing electrode. The backing electrode is connected to ground by means of a by-pass capacitor, and a high direct current bias potential is applied between the two knife-edged electrodes. The bias potential is such that the potential between each of the electrodes and the backing electrode is greater than a threshold value (i.e., the voltage that must be applied across a moving tape before any appreciable current results in the external circuit connected with the electrodes) but less than the breakdown voltage of the tape. Since the two knife-edges and the two thicknesses of tape are in direct current series, the direct bias current of the tape is identically the same under each knife-edge but oppositely directed through it. This causes the tape to emerge from the second electrode in a substantially uncharged condition in the absence of a signal.

Signal voltage is applied between ground and the second electrode, and hence the resulting alternating current signal passes through the tape between the second knife edge and the backing electrode and thence through the by-pass capacitor to ground. The signal current modulates the direct bias current of the second knife-edge only, and the tape emerges from the second electrode with a dipole type of internal electrification that is proportional to the signal. Ion treatment of the charged tape greatly enhances the permanence of the recording and preserves a high signal-to-noise ratio.

For playback, the recorded tape is drawn between one of the knife-edged electrodes and the backing electrode. A voltage proportional to the recorded signal is generated across the electrode by electrostatic induction and that voltage is then suitably amplified for operation of a speaker or other device.

It is a characteristic of the tape record medium that it has a certain amount of background noise when it is received from the manufacturer thereof. This background noise in tape may be reduced by subjecting the tape to one or more of the method steps disclosed herein.

An object of the present invention is the provision of a method of reducing the background noise of a recording medium. Another object of the invention is to provide a method of processing a record medium electrically for reducing the background noise therein. Still another object is to provide a combination of steps which individually and jointly reduce the background noise level of a record medium.

Many other advantages, features and objects of the present invention will become apparent by reference to the following description and accompanying drawings.

Figures 1, 2, 3:
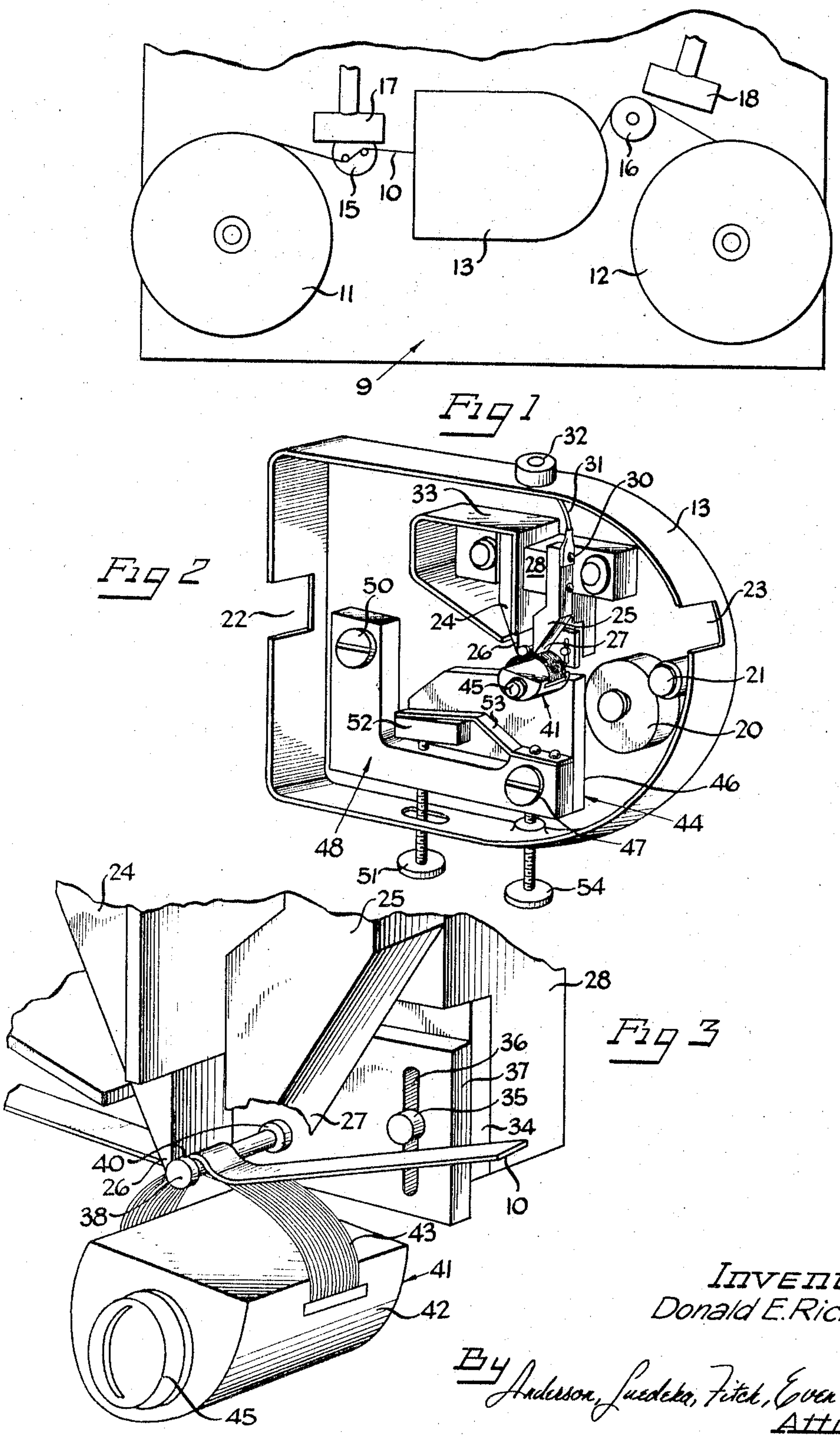
FIGURE 1 is a diagrammatic view of an electrostatic recording system which may be employed to practice certain of the steps of the treating method in accordance with the present invention.
FIGURE 2 is an enlarged view of the interior of the case shown in FIGURE 1.
FIGURE 3 is an enlarged fragmentary view of FIGURE 2 with portions omitted and broken away for clarity.

A method of treating an electrostatic recording medium, in accordance with the present invention, generally comprises the steps of moving the medium past a first D.-C. field of such potential as to cause a current flow of electric charges across the surface barrier of the medium. Thereafter, the medium is subjected to a second D.-C. field of opposite polarity to the first D.-C. field and of a strength such as to cause an identical current to flow to the medium.

For purposes of explanation, the treating method is described hereinafter in connection with an electrostatic recorder assembly 9 for treating a dielectric tape 10. Specifically, the electrostatic recorder assembly 9 in FIGURE 1 includes a rotatably mounted supply reel 11, a rotatably mounted take-up reel 12, and a metal head assembly case 13 disposed intermediately therebetween, the tape passing through the case 13 in its passage from the supply reel 11 to the take-up reel 12. A tape guide 15 is provided intermediate the supply reel 11 and the head assembly case 13 to insure that the tape 10 enters the head assembly case 13 at the same position, while a roller 16 performs a similar function at the discharge side of the head assembly case 13 for insuring that the tape 10 leaves the head assembly case at a same relative angle in its travel to the take-up reel 12. Immediately prior to the entrance of the tape 10 into the head assembly case 13, there is disposed an ion source 17, and immediately preceding the rewinding of the record medium 14 on the take-up reel 12, there is disposed a second ion source 18.

The tape 10 is metered in its passage between the supply reel and take-up reel by a driven capstan 20 and a coacting pressure roller 21 (see FIGURE 2), the tape passing between the pressure roller 21 and the capstan 20 and then about the pressure roller 21. Both the pressure roller 21 and the capstan 20 are disposed within the case 13, the tape 10 entering the case 13 through a slot 22 on one side thereof and leaving through a slot 23 on the other side of the case 13.

As shown particularly in FIGURE 2, a pair of spaced electrodes 24 and 25 are disposed within the head assembly case 13, one of which serves as a prebias electrode 24 and the other of which serves as a record electrode 25. In the illustrated embodiment, the electrodes 24 and 25 are substantially identical to each other and each is formed so as to provide a knife edge 26 and 27, respectively, best seen in FIGURE 3, engaging one side of the tape 10.

An electrode support 28 of insulating material is carried by the case 13 and receives and supports both of the electrodes 24 and 25. Each of the electrodes 24 and 25 is secured by a pair of screws 30 extending therethrough into the support 28, one of which is also used to secure one end of an electrical lead 31 to the record electrode 25. The other end of the electrical lead 31 is connected to a terminal 32 on the case 13.

In order to minimize coupling between the electrodes 24 and 25, a grounded shield 33 is disposed intermediate the prebias and record electrodes 24 and 25. The shield 33 extends substantially about the prebias electrode 24, there being but a small opening through which the knife edge 26 extends.

As shown in FIGURE 3, the support 28 also includes a spacer 34 suitably secured thereto, which threadably receives a pair of screws 35, only one of which is shown, extending through slots 36 in a pin plate 37. The plate 37 supports a guide pin 38 which serves to guide the tape laterally of its movement, the tape passing over the pin 38 between the electrodes 24 and 25. In this connection the pin 38 is provided with a pair of confronting shoulders 40 between which the tape 10 extends. The slots 36 in the pin plate 37 permit the plate 37 to be adjusted, and thereby adjust the pin 38 vertically with respect to the knife edges 26 and 27.

The tape is pressed against the electrodes 24 and 25 by a common backing electrode 41 which includes a conductive semi-cylindrical member 42, and a plurality of fine wires 43, such as of nickel, connected electrically and mechanically to the member 42. The wires 43 are disposed in a single layer in close side by side relation to each other.

As shown in FIGURE 2, the backing electrode 41 is carried by a means 44 for adjusting the lateral and vertical engagement of the wires 43 with respect to the knife edges 26 and 27. In this connection, the backing electrode 41 is secured by an eccentrically disposed screw 45 to a supporting plate 46. The plate 46 is pivoted on a pivot 47 carried by one end of an L-shaped bracket 48 and generally disposed directly below the backing electrode. The other end of the bracket 48 is pivoted on a pivot 50 connected to the case 13. Engagement of the wires relative to the respective electrodes is adjusted by pivoting the plate 46 with respect to the bracket 48. This is accomplished by adjusting a screw 51 which is threaded centrally in the bracket 48 and engages an ear 52 rigidly carried by the end of plate 46 opposite the pivot 47. The plate 46 is biased downwardly by a leaf spring 53 which is carried by the bracket 48 and bears against the ear 52. As seen in FIGURE 2, the screw 51 extends to the outside of the case whereby the screw 51 may be easily turned.

Vertical adjustment of the backing electrode 41, relative to both electrodes 24 and 25, is provided by rotating the bracket 48 about the pivot 50. This is accomplished by movement of a screw 54 which is threadably carried by the case 13 and which acts against a lever arm portion of the bracket 48 at a point directly below the pivot 47. The lever arm between the pivot 50 and the screw 54 is rather lengthy, and hence there is very little differential adjustment which occurs between the knife edges when the screw 54 is repositioned. The screw 54 is retracted in order to thread tape 10 between the electrodes.

Figure 5:
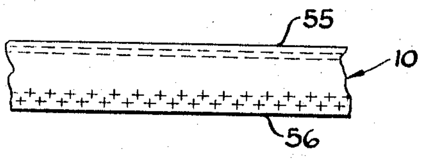
FIGURE 5 represents diagrammatically the condition of a record after travel across the first head of FIGURE 2.
Figure 6:
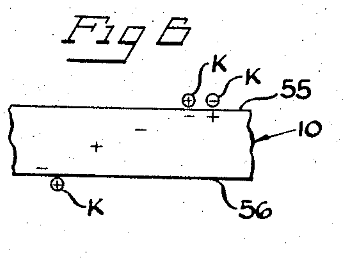
FIGURE 6 represents diagrammatically the condition of the record medium after travel across the second electrode of FIGURE 2.
Figure 4:
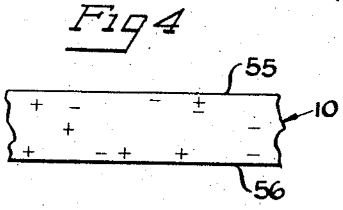
FIGURE 4 is a diagrammatic view of a section of recording tape as it is received from the manufacturer.

The condition of the virgin tape as received from the manufacturer is diagrammatically illustrated in FIGURE 4. It will be noted that there is a quantity of electrostatic charges disposed within the thickness of the tape, intermediate the surfaces 55 and 56, the thickness of the tape being greatly exaggerated from the actual thickness of .00025 inch. As disclosed hereinafter, the tape in its passage through the electrodes is first subjected to a unidirectional prebias field, whereby the tape takes on a condition such as shown diagrammatically in FIGURE 5. Thereafter, the prebiased tape 10 shown in FIGURE 5 is subjected to a similar field of opposite polarity, thereby altering the charge pattern along the tape so that the charges therein are effectively neutralized. Theoretically, the tape should thus be left in an uncharged condition. As a practical matter, such a result is not achieved. However, there is a substantial decrease in the number of randomly spaced charges in the tape, such as shown in FIGURE 6, as evidenced by reduced noise output from the tape when passed through an electrostatic playback system.

Figure 8:
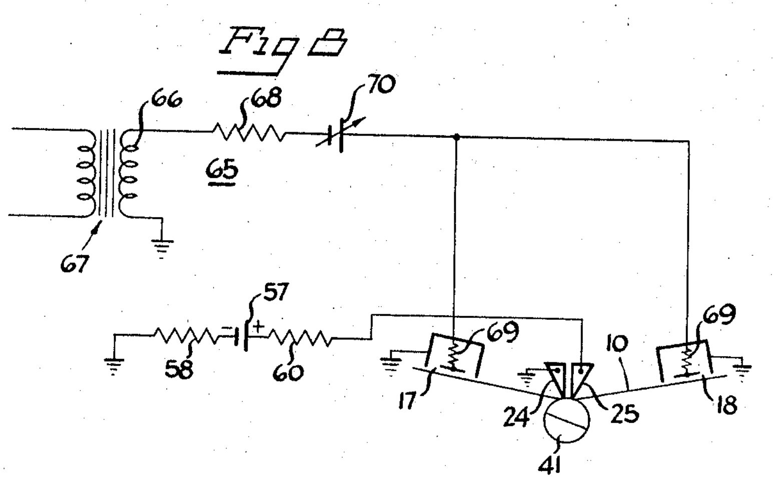
FIGURE 8 is a diagrammatic view of a system for treating an electrostatic record tape.

FIGURE 8 illustrates an electrical circuit for use in conjunction with the head assembly of FIGURE 2 to effect the electrical conditioning steps. Prebiasing and biasing voltages are provided by coupling a D.-C. power supply 57 in series with the record electrode 25, the backing electrode 41 and the prebias electrode 24, thereby causing a D.-C. current to flow from the record electrode 25 through the record medium 10 to the backing electrode 41 and again through the record medium 10 as a charging current to the prebias electrode 24. The D.-C. charging current through the moving tape is thus identically the same under each knife edge, but oppositely directed through it.

As shown in FIGURE 8, the negative side of the D.-C. power supply is grounded through a resistor 58, and the positive side of the power supply is coupled to the record electrode 25 through a coupling resistor 60. The prebias electrode 24 is grounded to complete the circuit. Thus, a positive potential is applied to the record electrode 25, the backing electrode 41 being relatively negative with respect thereto, and the prebias electrode 24 being relatively positive with respect to the backing electrode.

The voltage of D.-C. power supply 57 is made such that the D.-C. voltage both between the prebias electrode 24 and the backing electrode 41, and between the record electrode 25 and the backing electrode 41 is greater than threshold value of the moving tape but less than the breakdown voltage of the tape. Threshold voltage is the voltage that must be applied across moving tape before any appreciable current flows through the electrodes.

Therefore, at the prebias electrode 24 the medium 10 is first subjected to an electric field of a magnitude exceeding the threshold value of the record medium but less than the breakdown electric field strength. This effects an injection of electric charges of opposite sign into opposite sides of the record medium, the charges being on the interior of the tape and being uniformly distributed. Stated otherwise, the record medium is first subjected to a uniform electric field which establishes a direct current flow of charges across the surface barrier of the record medium and into successive minute regions of the record medium, whereby the charges are bound below the surface thereof within the interior of the record medium.

Thereafter, at the record electrodes 25 the medium is subjected to a second field similar in character to that to which it was first exposed, but opposite in direction and polarity and having a smaller amplitude.

When dielectric tape is handled as supplied, and also due to its handling, there is a tendency because of friction with materials against which it comes in contact to develop static surface charges. The surface charges, unless neutralized, contribute to the background noise obtained from the record medium. However, we have found that substantially all of the surface charges are neutralized by exposing the tape to one of the ion sources 17 and 18. Preferably, the tape is exposed to a source of ions both before and after the electric field steps.

Figure 7:
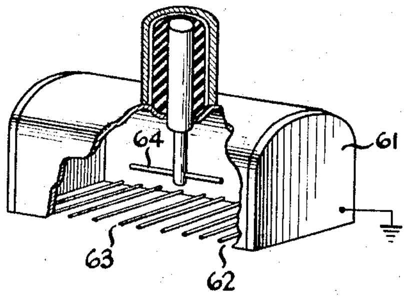
FIGURE 7 illustrates in diagrammatic form, partly in perspective and broken away, one of the ion sources shown in FIGURE 1.

Referring now to FIGURE 7, one of the ion sources is shown in greater detail. The source includes a grounded conductive case 61 which is open at one side 62, and which is provided with an electrostatic shield 63 across the opening 62. A pointed tungsten electrode 64 is insulatively supported within the case 61.

As shown in FIGURE 8 both of the ion sources 17 and 18 are connected to a common power circuit 65. In the circuit, one side of a secondary winding 66 of a power line transformer 67 is connected through current limiting resistors 68 and 69 and a variable D.-C. power supply 70 to each of the electrodes 64. The other side of the secondary winding 66 is grounded. The A.-C. voltage is applied between the electrode 64 and the shield 63, and therefore the resulting field does not extend outwardly of the ion source. Consequently, the ion source does not provide a source of interference or of permanent signals for the record medium.

Each of the ion sources 17 and 18 is supported in the recorder assembly so that the opening 62 is adjacent the record medium 10. Application of A.-C. voltage to the transformer 67 produces a slight corona at each of the tips of both electrodes 64. Air which diffuses through the open side 62 becomes ionized and then diffuses back again against the record medium to neutralize the surface charges. Preferably, the D.-C. power supply 70 is adjusted so that approximately an equal number of positive and negative ions are provided at the tape 10.

It is believed that the ions produced by the ion source, besides neutralizing the surface charges, are also retained on the surfaces of the tape by electrostatic attraction to the internal charges adjacent the opposite surfaces of the record tape. These ions, which are indicated diagrammatically at K, in FIGURES 4 and 5, are believed to act as keepers tending to prevent the migration of the injected charges of opposite polarity toward each other through the thickness dimension of the tape.

Further, when a charged tape such as indicated in FIGURE 4 or FIGURE 5 is wound in a reel, keepers applied to the external surfaces of the tape as illustrated in FIGURES 4 and 5 apparently act to prevent the recorded signal of one layer of tape from affecting a permanent alteration in the charge distribution of adjacent layers of tape. When charged tape is stored on a reel without the use of ions, the tape becomes very noisy and the phenomenon of signal transfer between adjacent convolutions of the tape on the reel is observed. It is believed that the ions serve to neutralize the external fields of the internal recorded charges in the tape and produce a net reduction in the external electric field which might otherwise contribute to the transfer phenomenon.

For unused tape, proper ion generator adjustment results in above a 10 decibel reduction in tape noise if the tape is subjected to ions after passage over roll 16, FIGURE 1, and immediately wound onto the take-up reel 12. Ions are particularly beneficial in reducing high frequency noise in unused roll tape while electric treatment of unused roll tape appears to be beneficial in reducing low frequency noise.

Further reduction in noise level is obtained by storing the tape 10 in the condition indicated by FIGURE 6 for a period of time following the neutralizing of charges. The net improvement is not too predictable until at least seven days' storage time has elapsed, after which period further storage reduces the level of background noise.

Preferably, the tape is stored in a dry atmosphere, such as in a chamber containing a desiccant, such as active silica gel. Such storage effects a reduction in background noises, even though the tape has not been treated electrically as described. Moreover, the best results are obtained when the tape is subjected to both the electrical treatment and to the desiccation during the storage period which follows thereafter.

The greatest reduction in noise level tends to occur during the early portion of the storage period, and particularly after the first seven days have elapsed. However, it has been observed that background noise continues to decrease for at least as long as 46 days.

The following example is given to indicate the magnitude of the results achieved by the foregoing steps. It is to be understood that these values are representative and are not presented to limit the invention. A typical tape has a noise value which averages about .329 millivolt before it had been used. After seven days' storage in a desiccator, the average noise level decreases to about 0.296 millivolt. After about forty-six days' storage, the average noise level decreases to about 0.237 millivolt. Of course, the noise level is not constant. The spread after seven days in noise peaks is on the order of 0.085 millivolt, while after forty-six days, the spread decreases to about 0.071 millivolt.

A similar tape which has an initial average noise level before treatment of 0.329 millivolt when subjected both to the above described electrical field steps and the desiccated storage for seven days, has an average noise level of about 0.319 millivolt. After about forty-six days' storage, the average noise level decreases to about 0.204 millivolt. The spread in noise peaks after seven days is about 0.065 millivolt, which decreases to 0.037 millivolt at forty-six days.

An analysis of these figures indicates that the average noise level goes down due to desiccation, and that the average noise level also goes down due to the electrical treatment described. It also indicates that a greater improvement is effected by utilizing both of the steps. Further, the spread between the peaks of noise decreases with desiccation alone, and decreases more when both desiccation and electrical treatment are applied. Since both the average noise level and the spread between noise peaks decrease, the highest or upper noise peaks are decreased or neutralized more efficiently than are the lower peaks.

Noise may be eliminated from a tape during manufacture by rendering the interior of the tape conductive or of relatively less resistivity, for example, by impregnating the tape with moisture. This is accomplished by disposing the tape in an atmosphere of relatively high humidity for a period sufficient to impregnate the tape with moisture. The tape is then subjected to a dry atmosphere to restore the normal high resistivity of the medium.

The record medium may also be rendered temporarily conductive by subjecting the record medium to radiation from a radioactive source.

In one specific example, a roll of 1200 feet of 0.25 in. wide, 0.00025 in. Mylar tape which is wound on a 3 inch diameter, 0.5 in. wide polystyrene cylinder, is exposed to the radiation from a cobalt-60 source. The tape is given a dosage of approximately $1.09 \times 10^5$ roentgens in one hour, the dosage being measured with a ceric-sulfate dosimeter. The irradiated tape has a noise reduction of approximately 50 percent.

The tape is then subjected to an additional dosage at approximately the same rate for another hour, thereby bringing the total dosage to $2.0 \times 10^5$ R. No further reduction in noise is observed.

It will be apparent that various changes and modifications may be made in the above described treatment method without departing from the spirit or scope of the present invention.

Various features of the present invention are set forth in the accompanying claims.

What is claimed is:

1. In the electrostatic recording art, a method of treating an electrostatic record medium of dielectric material to reduce the quantity of electrostatic charges disposed within the medium so as to thereby reduce the background noise level of the medium, said method comprising passing said electrostatic record medium through and generally perpendicularly to a first electric field which produces a voltage across the medium of a magnitude greater than a threshold value at which an abrupt rise in charge current occurs to the record medium, but less than a breakdown voltage of the medium where sparkthrough of the record medium begins, thereby injecting charges of opposite sign into opposite sides of the record medium, thereafter passing said record medium through and generally perpendicularly to a second electric field of opposite polarity to said first electric field, said second field producing a voltage across the medium which is of a magnitude greater than a thereshold value of the charged medium, but less than the breakdown voltage of the medium, and proportioning the first and second electric fields to produce substantially equal and opposite charge currents to the medium.

2. In the electrostatic recording art, a method of treating an electrostatic record medium of dielectric material to reduce the quantity of electrostatic charges disposed within the medium so as to thereby reduce the background noise level of the medium, said method comprising passing said electrostatic record medium through and generally perpendicularly to a first electric field which produces a voltage across the medium of a magnitude greater than a threshold value at which an abrupt rise in charge current occurs to the record medium, but less than the breakdown voltage of the medium where sparkthrough of the record medium begins, thereby injecting charges of opposite sign into opposite sides of the record medium, thereafter passing said record medium through and generally perpendicularly to a second electric field of opposite polarity to said first electric field, said second field producing a voltage across the medium which is of a magnitude greater than a threshold value of the charged medium, but less than a breakdown voltage of the medium, proportioning the first and second electric fields to produce substantially equal and opposite charge currents to the medium, substantially simultaneously therewith subjecting the medium to a source of ions for neutralizing all static charges at the surface of the record medium, and thereafter storing the medium for a period of at least seven days prior to its first use.

3. In the electrostatic recording art, a method of treating an electrostatic record medium of dielectric material to reduce the quantity of electrostatic charges disposed within the medium so as to thereby reduce the background noise level of the medium, said method comprising passing said electrostatic record medium through and generally perpendicularly to a first electric field which produces a voltage across the medium of a magnitude greater than a threshold value at which an abrupt rise in charge current occurs to the record medium, but less than the breakdown voltage of the medium where sparkthrough of the record medium begins, thereby injecting charges of opposite sign into opposite sides of the record medium, thereafter passing said record medium through and generally perpendicularly to a second electric field of opposite polarity to said first electric field, said second field producing a voltage across the medium which is of a magnitude greater than a threshold value of the charged medium, but less than a breakdown voltage of the medium, proportioning the first and second electric fields to produce substantially equal and opposite charge currents to the medium, subjecting the medium to a source of ions both before subjection to the first field and after subjection to the second field, respectively, for neutralizing all static charges at the surface of the record medium, and thereafter storing the record medium for a period of at least seven days prior to its first use.

4. In the electrostatic recording art, a method of treating an electrostatic record medium of dielectric material to reduce the quantity of electrostatic charges disposed within the mediuum so as to thereby reduce the background noise level of the medium, said method comprising passing said electrostatic record medium through and generally perpendicularly to a first electric field which produces a voltage across the medium of a magnitude greater than a threshold value at which an abrupt rise in charge current occurs to the record medium, but less than a breakdown voltage of the medium where sparkthrough of the record medium begins, thereby injecting charges of opposite sign into opposite sides of the record medium, thereafter passing said record medium through and generally perpendicularly to a second electric field of opposite polarity to said first electric field, said second field producing a voltage across said record medium which is of a magnitude greater than a threshold value of the charged medium, but less than the breakdown voltage, proportioning the first and second electric fields to produce substantially equal and opposite charge currents to the medium, and thereafter storing the dielectric record medium in a dry atmosphere for a period of at least seven days prior to its first use.

5. In the electrostatic recording art, a method of treating an electrostatic record medium of dielectric material to reduce the quantity of electrostatic charges disposed within the medium so as to thereby reduce the background noise level of the medium, said method comprising passing said electrostatic record medium through and generally perpendicularly to a first electric field which produces a voltage across said medium of a magnitude greater than a threshold value at which an abrupt rise in charge current to the record medium occurs, but less than a breakdown voltage of the medium where sparkthrough of the record medium begins, thereby injecting charges of opposite sign into opposite sides of the record medium, thereafter passing said record medium through and generally perpendicularly to a second electric field of opposite polarity to said first electric field, said second field producing a voltage across said medium of a magnitude greater than a threshold value of the charged medium but less than the breakdown voltage of the medium, proportioning the first and second electric fields to produce substantially equal and opposite charge currents to the medium, thereafter subjecting said electrostatic record medium to a source of ions.

References Cited by the Examiner

UNITED STATES PATENTS

| | | | |
|---|---|---|---|
| 2,878,120 | 3/1959 | Mayer et al. ------ | 317—262 X |
| 3,196,270 | 7/1965 | Rosenthal ---------- | 250—49.5 |

OTHER REFERENCES

IBM Technical Disclosure Bulletin, vol. 6, No. 2, July 1963, page 42.

MILTON O. HIRSHFIELD, *Primary Examiner.*

J. A. SILVERMAN, *Assistant Examiner.*